US011909754B2

(12) United States Patent
Inokuchi et al.

(10) Patent No.: US 11,909,754 B2
(45) Date of Patent: Feb. 20, 2024

(54) SECURITY ASSESSMENT SYSTEM (71) Applicants: NEC CORPORATION, Tokyo (JP); B. G. Negev Technologies and Applications Ltd. at Ben-Gurion University, Beer-Sheva (IL)

(72) Inventors: Masaki Inokuchi, Tokyo (JP); Yoshinobu Ohta, Tokyo (JP); Ron Bitton, Yehud (IL); Orly Stan, Ashdod (IL); Asaf Shabtai, Hulda (IL); Yuval Elovici, Arugot (IL)

(73) Assignees: NEC CORPORATION, Tokyo (JP); B.G. Negev Technologies and Applications Ltd., at Ben-Gurion University, Beer-Sheva (IL)

( * ) Notice: Subject to any disclaimer, the term of this patent is extended or adjusted under 35 U.S.C. 154(b) by 201 days.

(21) Appl. No.: 16/980,313

(22) PCT Filed: Mar. 14, 2018

(86) PCT No.: PCT/JP2018/010015
§ 371 (c)(1),
(2) Date: Sep. 11, 2020

(87) PCT Pub. No.: WO2019/176021
PCT Pub. Date: Sep. 19, 2019

(65) Prior Publication Data
US 2021/0250370 A1    Aug. 12, 2021

(51) Int. Cl.
*H04L 9/40* (2022.01)
*G06F 21/57* (2013.01)

(52) U.S. Cl.
CPC ........ *H04L 63/1433* (2013.01); *G06F 21/577* (2013.01); *H04L 63/1416* (2013.01)

(58) Field of Classification Search
CPC ........ G06F 21/57; G06F 21/577; G06F 9/455; G06F 30/00; G06F 11/261;
(Continued)

(56) References Cited

U.S. PATENT DOCUMENTS 6,009,256 A * 12/1999 Tseng .................. G06F 30/331
703/23
6,971,026 B1    11/2005 Fujiyama et al.
(Continued)

FOREIGN PATENT DOCUMENTS

JP     09-193077 A     7/1997
JP     2001-101135 A   4/2001
(Continued)

OTHER PUBLICATIONS

Lemay et al., "An isolated virtual cluster for SCADA network security research", Proceedings of the 1st International Symposium for ICS & SCADA Cyber Security Research 2013, Sep. 16, 2013, pp. 88-96 (9 pages total).

(Continued)

*Primary Examiner* — Daniel B Potratz
*Assistant Examiner* — Matthias Habtegeorgis
(74) *Attorney, Agent, or Firm* — Sughrue Mion, PLLC (57) ABSTRACT

A security assessment system is configured to provide a duplicated environment which duplicates an assessment target system comprising a plurality of physical components. The security assessment system includes a duplicated environment design circuitry and a duplicated environment construction circuitry. The duplicated environment design circuitry is configured to select a duplication level based on constraints specified by a user in order to design the duplicated environment to produce a designed result indicative of a duplicated environment design. The duplication level is indicative of any one of a simulation sub-module, an emu- (Continued)

lation sub-module, and a physical sub-module which are for reproducing the physical components of the assessment target system. The duplicated environment construction circuitry is configured to construct the duplicated environment based on the designed result. The duplicated environment includes components which are duplicated by one of the duplication level.

10 Claims, 8 Drawing Sheets

(58) Field of Classification Search
CPC ............ G06F 11/3466; G06F 11/3457; H04L 63/1416; H04L 63/1433
See application file for complete search history.

(56) References Cited

U.S. PATENT DOCUMENTS

| | | | |
|---|---|---|---|
| 7,904,962 B1 | 3/2011 | Jajodia et al. | |
| 2007/0129926 A1 | 6/2007 | Verheyen et al. | |
| 2009/0320137 A1* | 12/2009 | White | H04L 63/1433 707/999.102 |
| 2014/0137257 A1 | 5/2014 | Martinez et al. | |
| 2014/0180644 A1* | 6/2014 | Maturana | G05B 19/05 703/1 |
| 2014/0337000 A1* | 11/2014 | Asenjo | G06Q 10/06 703/13 |
| 2016/0231716 A1* | 8/2016 | Johnson | G05B 13/041 |
| 2016/0274553 A1* | 9/2016 | Strohmenger | G05B 19/41885 |
| 2019/0245883 A1* | 8/2019 | Gorodissky | H04L 63/1433 |
| 2020/0106792 A1* | 4/2020 | Louie | H04L 63/1483 |
| 2020/0183345 A1* | 6/2020 | Wang | G06F 30/00 |
| 2020/0344084 A1* | 10/2020 | Shribman | H04L 69/16 |

FOREIGN PATENT DOCUMENTS

| | | |
|---|---|---|
| JP | 2013-171545 A | 9/2013 |
| JP | 2016-146039 A | 8/2016 |

OTHER PUBLICATIONS

Green et al., "Pains, Gains and PLCs: Ten Lessons from Building an Industrial Control Systems Testbed for Security Research", Proceedings of 10the USENIX Workshop on Cyber Security Experimentation and Test (CSET 17), Aug. 14, 2017 (8 pages total).
Decision to Grant a Patent dated Sep. 8, 2021 from the Japanese Patent Office in JP Application No. 2020-547018.
International Search Report for PCT/JP2018/010015 dated Jun. 19, 2018 [PCT/ISA/210].
Written Opinion for PCT/JP2018/010015 dated Jun. 19, 2018 [PCT/ISA/237].

* cited by examiner

SECURITY ASSESSMENT SYSTEM

CROSS REFERENCE TO RELATED APPLICATIONS

This application is a National Stage of International Application No. PCT/JP2018/010015 filed Mar. 14, 2018.

TECHNICAL FIELD

The present invention relates to a security assessment system, and in particular to a security assessment system which need to detect attack paths such as demand for OT (Operation Technology) system security.

BACKGROUND ART

The OT is the hardware and software dedicated to detecting or causing changes in physical process through direct monitoring and/or control of physical devices such as valves, pumps, etc. The OT is the use of computers to monitor or alter the physical state of a system, such as the control system for a power station or the control network for a rail system.

In related arts for the security assessment, there are an assessment based on active scan, a pen-test on the actual system, and an assessment on the system which is completely duplicated by using real hardware.

In the manner known in the art, digital twin refers to a digital replica of physical assets, processes and systems that can be used for various purposes. The digital representation provides both the elements and the dynamics of how an Internet of Things device operates and lives through its life cycle.

The digital twin integrates artificial intelligence, machine learning and software analytics with data to create living digital simulation models that update and change as their physical counterparts change. A digital twin continuously leans and updates itself from multiple sources to represent its near real-time status, working condition or position.

Various techniques related to the present invention have been known.

Patent Literature 1 discloses a security support and evaluation apparatus. In Patent Literature 1, a security evaluation and construction support program for constructing the security support and evaluation apparatus is stored in an external storage unit. A CPU executes the program loaded into a memory to realize, as processes, a countermeasure list making section, a security evaluation section, and an input/output control section. The countermeasure list making section makes a list of security countermeasures to be executed on each constituent component of an objective system specified by an operator. The security evaluation section evaluates a state of security of the objective system based on the information accepted from the operator, whether or not the security countermeasures to be executed to each of the constituent components of the objective system is executed. The input/output control section controls an input unit and a display unit to accept various kinds of commands from the operator or to display an output from the countermeasures list making section and the security evaluation section.

Patent Literature 2 discloses a prediction system for improving prediction accuracy in a prediction model. The prediction system disclosed in Patent Literature 2 comprises a sensor, a user terminal, an information offering server. The information offering server includes an acquisition unit, an information storage unit, a model storage unit, a model determination unit, and a prediction unit. The model determination unit determines a model used in a current prediction based on a type of factors acquired by the acquisition unit. The model determination unit may compare restriction condition for respective models stored in the model storage unit with information acquired by the acquisition unit to determine one or more models which are available by using information acquired by the acquisition unit. The model determination unit determines a most excellent model where at least one of prediction accuracy and a calculation time is most excellent as a model available in the prediction unit.

Patent Literature 3 discloses a thin client system for being capable of improving convenience in a user. The thin client system disclosed in Patent Literature 3 comprises a server and a client which are connected to each other via a network. The server decides whether or not input information of a pointer satisfies a predetermined condition. When the input information satisfies the predetermined condition, the server creates a duplicated vertical machine of the client.

Patent Literature 4 discloses a digital circuit design support system which is capable to carrying out development of an operating system and an application program in parallel with development of hardware by improving processing ability using an IC emulator to expand a range of a simulation thereof. The digital circuit design support system disclosed in Patent Literature 4 is also capable of carrying out not only modeling of a real printed circuit on which circuit elements are mounted but also operation development and verification of the hardware, development of the software, debugging, and so on. In the digital system as a simulation target, the system development can be advanced by carrying out simulation/emulation using various modeling techniques. The simulation/emulation can be carried out, using a simulator or an emulator composed of the hardware, by flexibly switching a function mode expressed with language, a configuration model expressed with language, an emulation mode, a real PCB (print circuit board), a real chip, and so on in accordance with a development phase, a development target, and so on.

CITATION LIST

Patent Literature

[PTL 1]
JP 2001-101135 A (U.S. Pat. No. 6,971,026)
[PTL 2]
JP 2016-146039 A
[PTL 3]
JP 2013-171545 A
[PTL 4]
JP 09-193077 A

SUMMARY OF INVENTION

Technical Problem

There are problems in the above-mentioned related arts.

The assessment based on active scan is not suitable for the OT system. This is because it is potential to impact on the system.

The pen-test on the actual system is also not suitable for the OT system. This is because it is also potential to impact on the system.

The assessment on the system which is completely duplicated by using real hardware is too expensive. This is because the real hardware used in the actual system is duplicated.

Summing up, the above-mentioned related technique cannot achieve the accurate assessment which is low cost and don't impact the OT system. The active scan on actual OT systems is prohibited. On the other hand, passive scan result is not enough to determine attack path accurately. In addition, some components cannot be modeled.

There are problems in the above-mentioned various techniques related to the present invention.

Patent Literature 1 merely discloses the security support and evaluation apparatus to enable an operator to evaluate the state of security of a system and to support the making security countermeasures of the system even if the operator does not have a high level of expertise. Patent Literature 1 neither discloses nor teaches the digital twin.

Patent Literature 2 merely discloses the prediction system for improving prediction accuracy in the prediction model. Patent Literature 2 also neither discloses nor teaches the digital twin.

Patent Literature 3 discloses the thin client system for being capable of improving convenience in the user. In Patent Literature 3, the duplicated vertical machine of the client is merely created in order to improve convenience of a user. Patent Literature 3 never aims to achieve an accurate assessment.

Patent Literature 4 merely discloses the digital circuit design support system which is capable to carrying out development of the operating system and the application program in parallel with development of hardware by improving processing ability using the IC emulator to expand the range of the simulation thereof. Patent Literature 4 neither discloses nor teaches how to configure the simulator and the emulator. In other words, in Patent Literature 4, as the simulator and the emulator, existing ones are used.

Summing up, the above-mentioned various techniques related to the present invention also cannot achieve the accurate assessment which is low cost and don't impact the OT system.

Solution of Problem

As a mode of the present invention, a security assessment system is configured to provide a duplicated environment which duplicates an assessment target system comprising a plurality of physical components. The security assessment system comprises a duplicated environment design circuitry configured to select a duplication level based on constraints specified by a user in order to design the duplicated environment to produce a designed result indicative of a duplicated environment design, the duplication level being indicative of any one of a simulation sub-module, an emulation sub-module, and a physical sub-module which are for reproducing the physical components of the duplicated environment; and a duplicated environment construction circuitry configured to construct the duplicated environment based on the designed result, the duplicated environment comprises components which are duplicated by one of the duplication level.

Advantageous Effects of Invention

An exemplary effect of the present invention can provide a low cost duplicated environment for zero-risk security assessment.

DESCRIPTION OF EMBODIMENTS

First Example Embodiment

Now, a first example embodiment of the present invention will be described.

Figure 1:
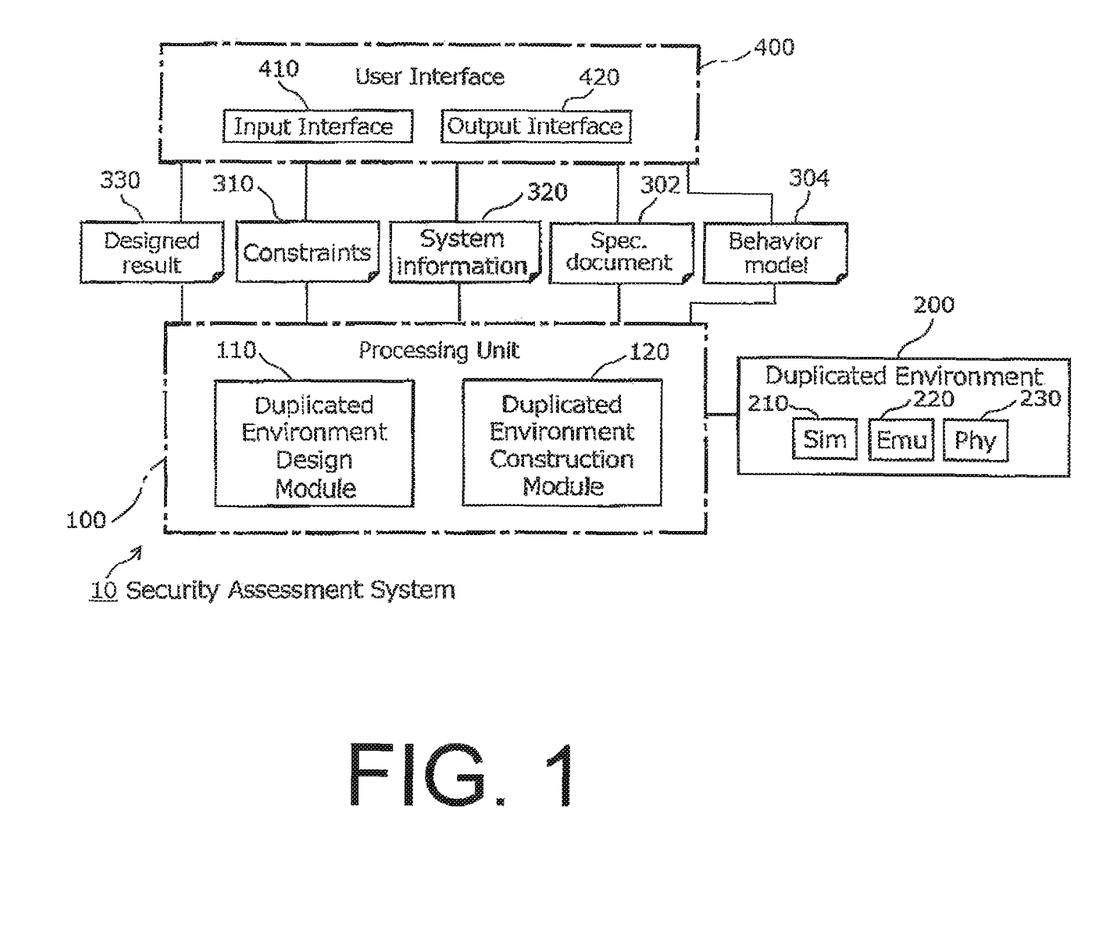
FIG. 1 is a block diagram that illustrates a structure example of a security assessment system according to a first example embodiment in the present invention.

FIG. 1 is a block diagram that illustrates a structure example of a security assessment system 10 according to the first example embodiment in the present invention. The security assessment system 10 is configured to provide a duplicated environment 200 which duplicates an assessment target system (not shown) comprising a plurality of physical components. The duplicated environment 200 serves as the above-mentioned digital twin. The security assessment system 10 comprises a processing unit 100 and a user interface (UI) 400. The processing unit 100 comprises a duplicated environment design module 110 and a duplicated environment construction module 120. The user interface 400 comprises an input interface 410 and an output interface 420.

In the example being illustrated, the duplicated environment 200 comprises a simulation sub-module 210, an emulation sub-module 220, and a physical sub-module 230. The simulation sub-module 210 is a specification 302 of the physical component or a behavior model 304 of a function of the physical component. The input interface 410 supplies the specification 302 and/or the behavior model 304 to the processing unit 100. The emulation sub-module 220 comprises software which reproduces the physical component using a VM (virtual machine). The physical sub-module 230 comprises a physical machine which is physically similar to the physical component in the assessment target system.

More specifically, in the simulation sub-module 210, the specification 302 of the physical component comprises a list of hardware/software and version which the physical component has. The specification 302 of the physical component typically may, for example, be a specification which is provided by a vendor or a specification in which information is integrated in accordance with CPE (Common Product Enumeration). The specification 302 of the physical component may have vulnerability information which is found by a vulnerability scanner. The simulation sub-module 210 may hierarchically have a derailed specification of each of software and hardware.

In the simulation sub-module 210, the behavior model 304 relates to a communication protocol or the like in which behavior is determined and comprises a module describing the behavior or a document associated to the behavior. Specifically, the behavior model 304 may be behavior documents defining the behavior of the physical component such as RFC (Request for Comments) or may be a document obtained by summarizing responses for inputs which are described based on the above-mentioned behavior documents. The behavior model 304 may be a mathematical model of the behavior. For instance, the communication protocol may be described by a state transition diagram or a Petri net. The behavior model 304 may be software for reproducing only responses addressing to inputs. However, software for reproducing a behavior of internal states in the physical component is handled by the emulation sub-module 220 in the manner which will presently be described.

In the emulation sub-module 220, the physical component is reproduced by the VM. That is, the emulation sub-module 220 comprises software which reproduces a behavior of the internal states in the physical component. The emulation sub-module 220 uses software which is identical with that of the assessment target system.

As described above, the physical sub-module 230 comprises the physical machine which is physically similar to the physical component in the assessment target system. That is, in the physical sub-module 230, the same hardware in the assessment target system is used and the same software in the assessment target system initially operates with the same configuration thereof.

As shown in FIG. 1, the duplicated environment design module 110 is supplied with constraints 310 specified by a user and with system information 320. The input interface 410 supplies the constraints 310 and the system information to the duplicated environment design module 110. The constraints 310 may be requirements such as budget. The duplicated environment design module 110 decides, in accordance with the constraints 310 and the system information 320, which physical component should be assessed by the simulation sub-module 210, the emulation sub-module 220, or the physical sub-module 230 to produce a designed result 330 indicative of a duplicated environment design. The output interface 420 outputs the designed result 330. The duplicated environment construction module 120 constructs the duplicated environment 200 based on the designed result 330 in the manner which will later be described. The duplicated environment 200 provides the duplicated environment for other software or a user (security expert, pen-tester).

Figure 2:
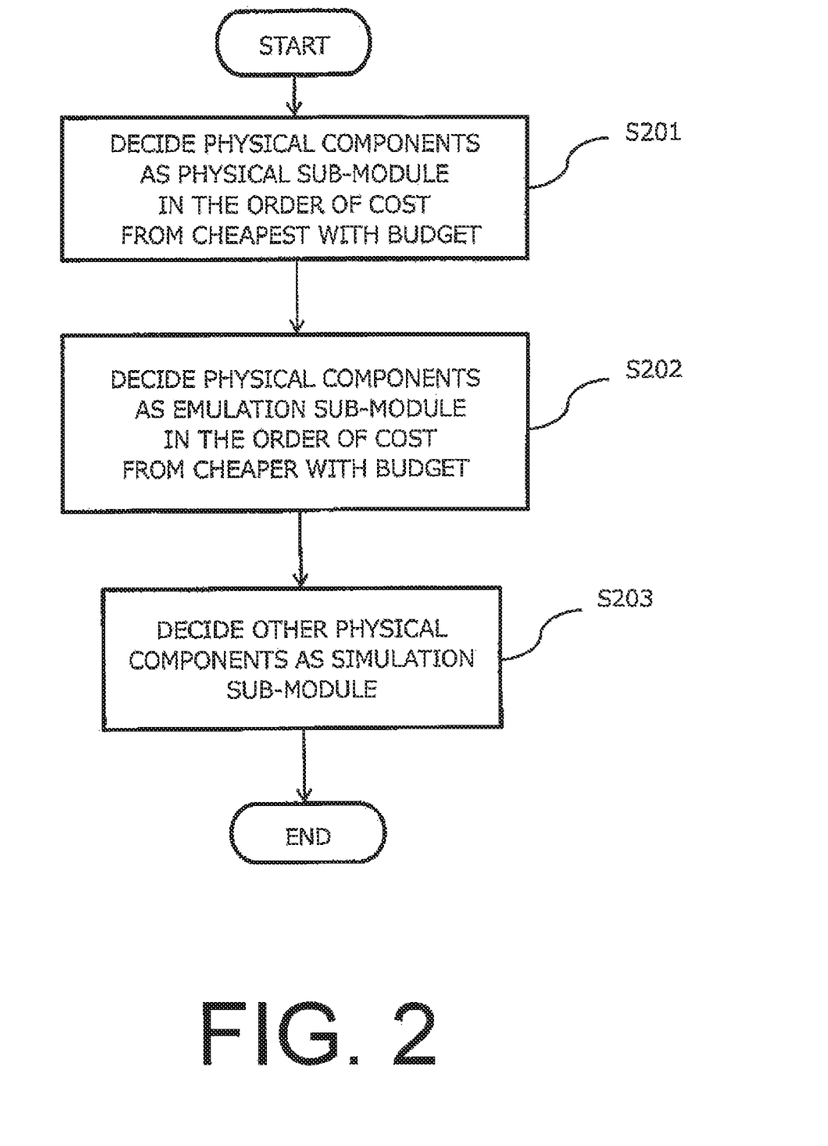
FIG. 2 is a flow diagram that illustrates an operation of a duplicated environment design module used in the security assessment system illustrated in FIG. 1.

Referring now to FIG. 2, the description will proceed to operation of the duplicated environment design module 110. The duplicated environment design module 110 decides a duplication level for each physical component in the assessment target system based at least on the constraints 310 specified by the user. As mentioned above, the constraints 310 may be requirements, for example, budget. The duplication level indicates one of the simulation sub-module 210, the emulation sub-module 220, and the physical sub-module 230. It is assumed that each physical component in the assessment target system is preliminary defined the cost to be emulated or prepare physical device.

The duplicated environment design module 110 decides the duplication level for each physical component in the assessment target system as follows.

First, the duplicated environment design module 110 decides the physical components as the physical sub-module 230 in the order of cost from cheapest with the budget (step S201).

Similarly, the duplicated environment design module 110 decides the physical components as the emulation sub-module 220 in the order of cost from cheaper within the budget (step S202).

Finally, the duplicated environment design module 110 decides other physical components as the simulation sub-module 210 (step S203).

Figure 3:
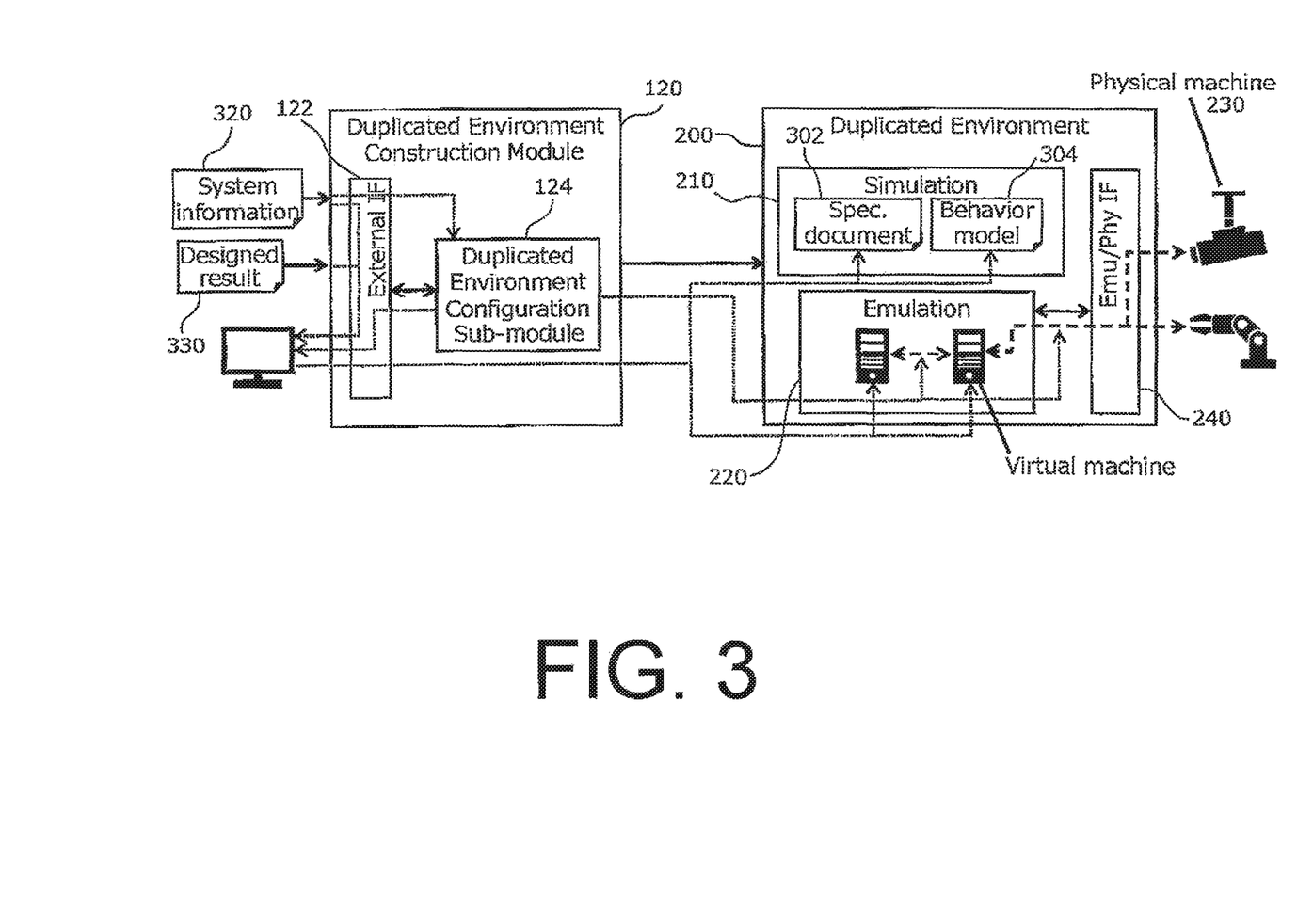
FIG. 3 is a block diagram that illustrates an operation of a duplicated environment construction module used in the security assessment system illustrated in FIG. 1.

Referring now to FIG. 3, the description will proceed to operation of the duplicated environment construction module 120. The duplicated environment construction module 120 has an external interface 122 to show the designed result 330 to the user and stores the specification 302 and/or the behavior model 304 provided by the user.

The duplicated environment construction module 120 comprises a duplicated environment configuration sub-module 124 which configures connection between the emulation sub-module (the virtual machines) 220 and the physical sub-module (physical machines) 230 via an emulation/physical interface (IF) 240.

Figure 4:
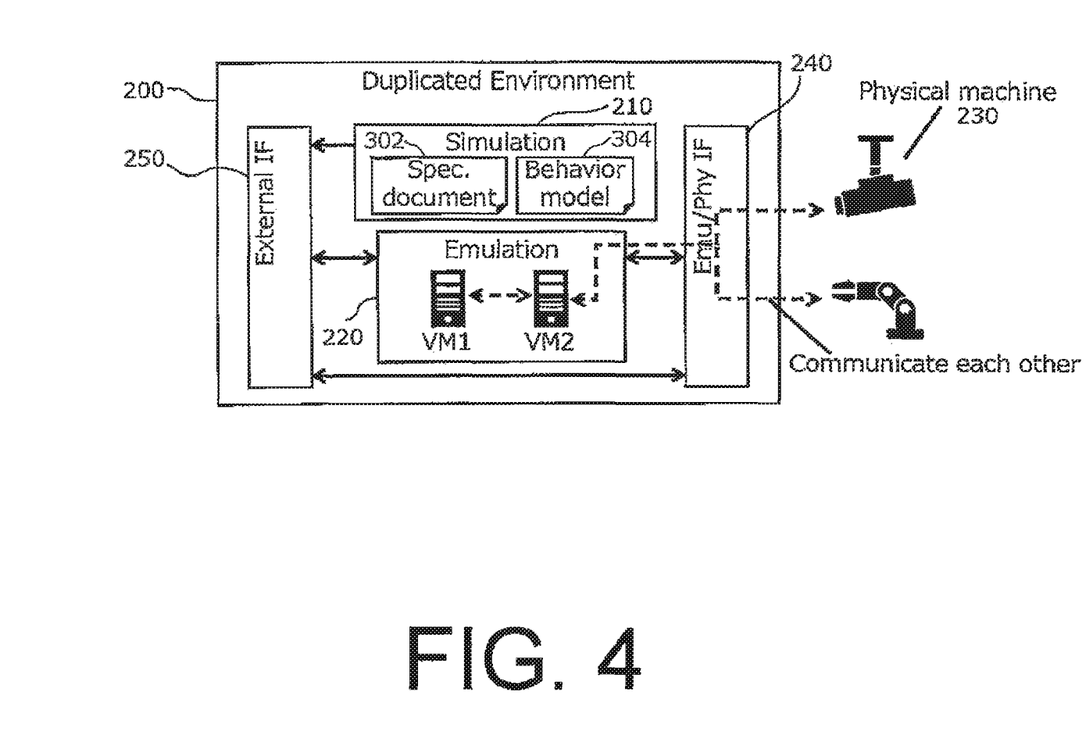
FIG. 4 is a block diagram that illustrates an operation of a duplicated environment used in the security assessment system illustrated in FIG. 1.

Referring now to FIG. 4, the description will proceed to operation of the duplicated environment 200. As described above, the duplicated environment 200 comprises the simulation sub-module 210, the emulation sub-module 220, and the physical sub-module 230.

The user interface 400 can carry out a security diagnosis including an active scan or a penetration test. The input interface 410 carries out any input for one or more interfaces of the VMs or the HW in the duplicated environment 200. Specifically, the input interface 410 may input any signal on channels (including virtual channels) between the VMs, between the VM and the physical machine, and between the physical machines. The virtual machines VM1 and VM2 in the emulation sub-module 220 and the physical machines in the physical sub-module 230 are virtually/physically connected to each other. The duplicated environment 200 comprises the emulation/physical interface 240 between the emulation sub-module 220 and the physical sub-module 230.

The output interface 420 may output responses and stage changes in the VMs or the HW in response to the input. The output interface 420 may output contents of the specification 302. The output interface 420 may output communication information (e.g. a packet capture) between the VMs, between the VM and the physical machine, and between the physical machines. The duplicated environment 200 further comprise an external interface (IF) 250 which provides the access each sub-module 210, 220, and 230. Via the external interface 250, a user can access any virtual machines VM1 and VM2 in the emulation sub-module 220 and the physical machines in the physical sub-module 230, and can communicate between the virtual machines VM1 and VM2 and the physical machines in the physical sub-module 230. Therefore, the user observes the behavior of each machine or communication, inputs malicious files, sends malicious packets, and so on. The security assessment system 10 may be configured to alter packets on a channel by combining the input interface 410 with the output interface 420. For example, the security assessment system 10 may edit the packet obtained from the output interface 420 to supply an edited packet to the input interface 410.

According to the first example embodiment, it is possible to provide low cost duplicated environment 200 for zero-risk security assessment.

The respective modules of the processing unit 100 in the security assessment system 10 may be realized using a combination of hardware and software. In a mode of the combination of the hardware and the software, the respective modules are realized as various means by developing a security assessment program in a RAM (random access memory) and by operating hardware such as a control unit (CPU (central processing unit)) or the like based on the security assessment program. The security assessment program may be recorded in a recording medium which may be distributed. The security assessment program recording in the recording medium is read in a memory via a wire, wireless, or the recording medium itself to operate the control unit or the like. The recording medium may by example be an optical disc, a magnetic disk, a semiconductor memory device, a hard disc, or the like.

If describing the above-mentioned first example embodiment by another expression, the processing unit 100 in the security assessment system 10 can be realized to cause a computer to operate, based on the security assessment program developed in the RAM, the duplicated environment design module 110 and the duplicated environment construction module 120.

Second Example Embodiment

Now, a second example embodiment of the present invention will be described.

Figure 5:
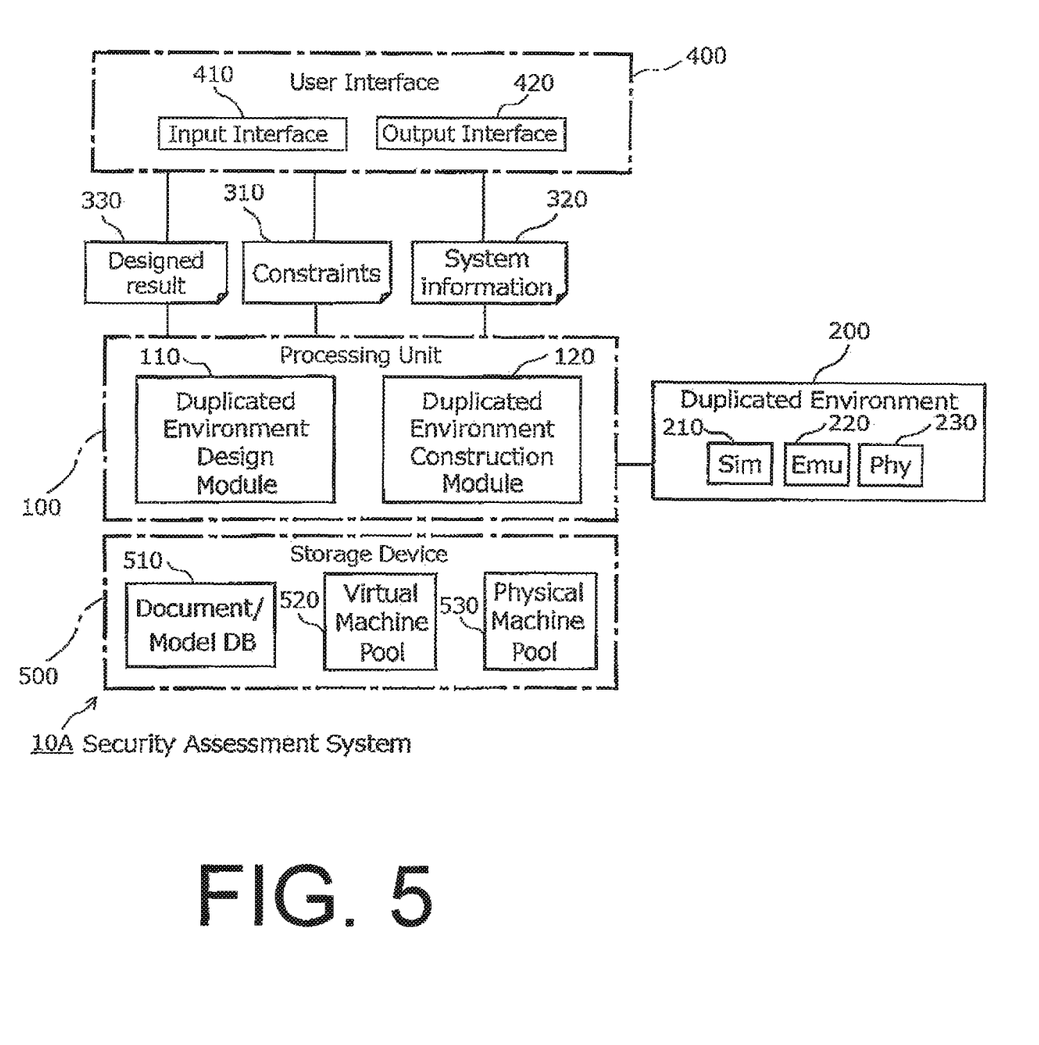
FIG. 5 is a block diagram that illustrates a structure example of a security assessment system according to a second example embodiment in the present invention.

FIG. 5 is a block diagram that illustrates a structure example of a security assessment system 10A according to the second example embodiment in the present invention. The security assessment system 10A further comprises a storage device 500 in addition to the processing unit 100 and the user interface 400 in the above-mentioned first example embodiment. The storage device 500 comprises a document/model database (DB) 510, a virtual machine pool 520, and a physical machine pool 530.

The document/model DB 510 stores documents indicative of specifications and a plurality of behavior models. The virtual machine pool 520 stores a plurality of virtual machines. The physical machine pool 530 stores a plurality of physical machines.

Figure 6:
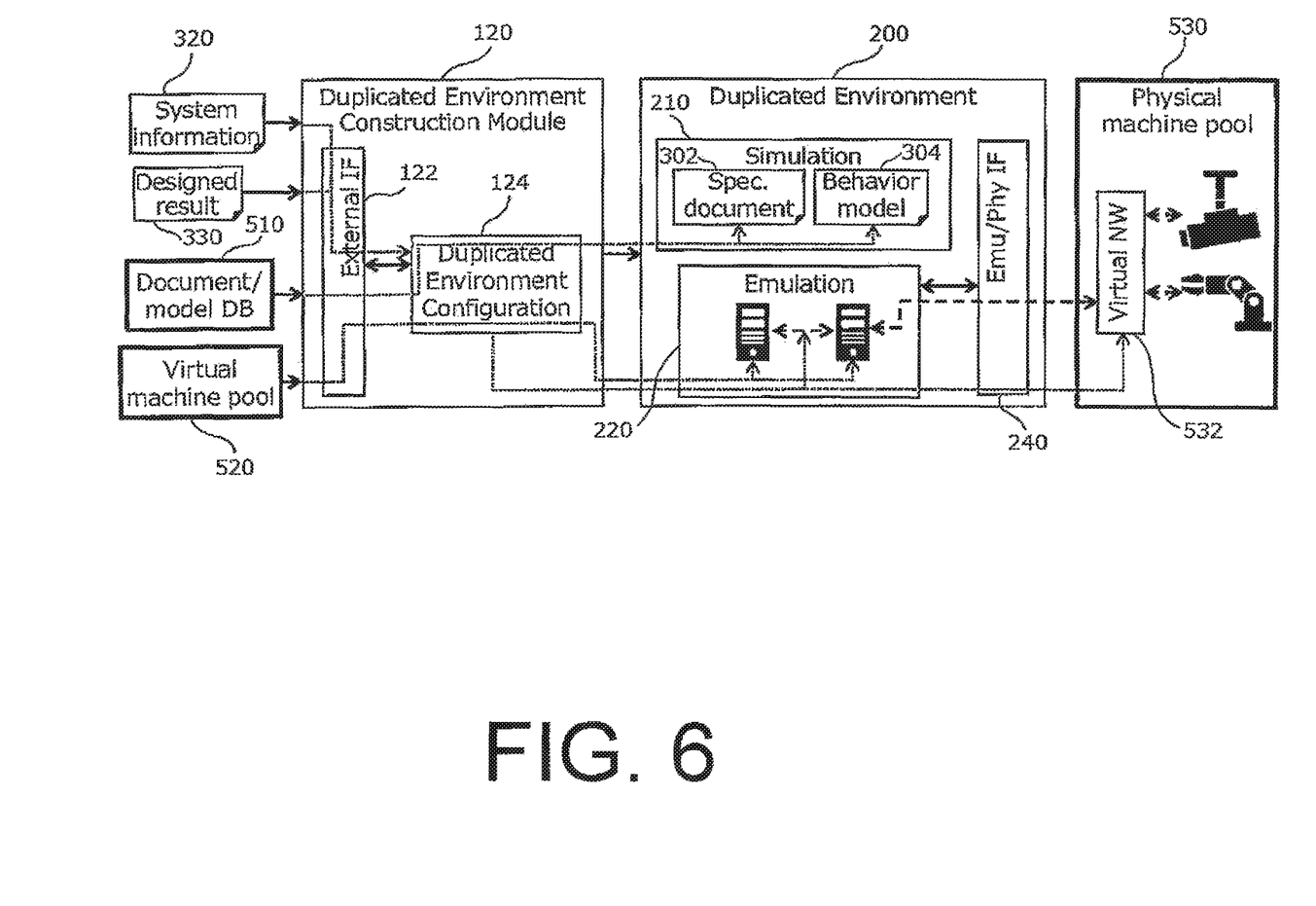
FIG. 6 is a block diagram that illustrates a relationship between the duplicated environment construction module and a document/model DB, a virtual machine pool, and a physical machine pool used in the security assessment system illustrated in FIG. 5.

FIG. 6 is a block diagram that illustrates a relationship between the duplicated environment construction module 120 and the document/model DB 510, the virtual machine pool 520, and the physical machine pool 530.

The duplicated environment construction module 120 sets up the duplicated environment 200 based on the designed result 330 and the system information 320. The duplicated environment construction module 120 stores at least one document and/or at least one behavior model at the simulation sub-module 210 from the document/model DB 510. The duplicated environment construction module 120 configures and stores at least one virtual machine at the emulation sub-module 220 from the virtual machine pool 520. The duplicated environment construction module 120 configures a virtual network (NW) 532 between the virtual machines and the physical machines in the physical machine pool 530.

According to the second example embodiment, it is possible to define the structure/configuration of the duplicated environment 200.

The respective modules of the processing unit 100 in the security assessment system 10A may be realized using a combination of hardware and software. In a mode of the combination of the hardware and the software, the respective modules are realized as various means by developing a security assessment program in a RAM (random access memory) and by operating hardware such as a control unit (CPU (central processing unit)) or the like based on the security assessment program. The security assessment program may be recorded in a recording medium which may be distributed. The security assessment program recording in the recording medium is read in a memory via a wire, wireless, or the recording medium itself to operate the control unit or the like. The recording medium may by example be an optical disc, a magnetic disk, a semiconductor memory device, a hard disc, or the like.

If describing the above-mentioned second example embodiment by another expression, the processing unit 100 in the security assessment system 10A can be realized to cause a computer to operate, based on the security assessment program developed in the RAM, the duplicated environment design module 110 and the duplicated environment construction module 120.

Third Example Embodiment

Now, a third example embodiment of the present invention will be described.

Figure 7:
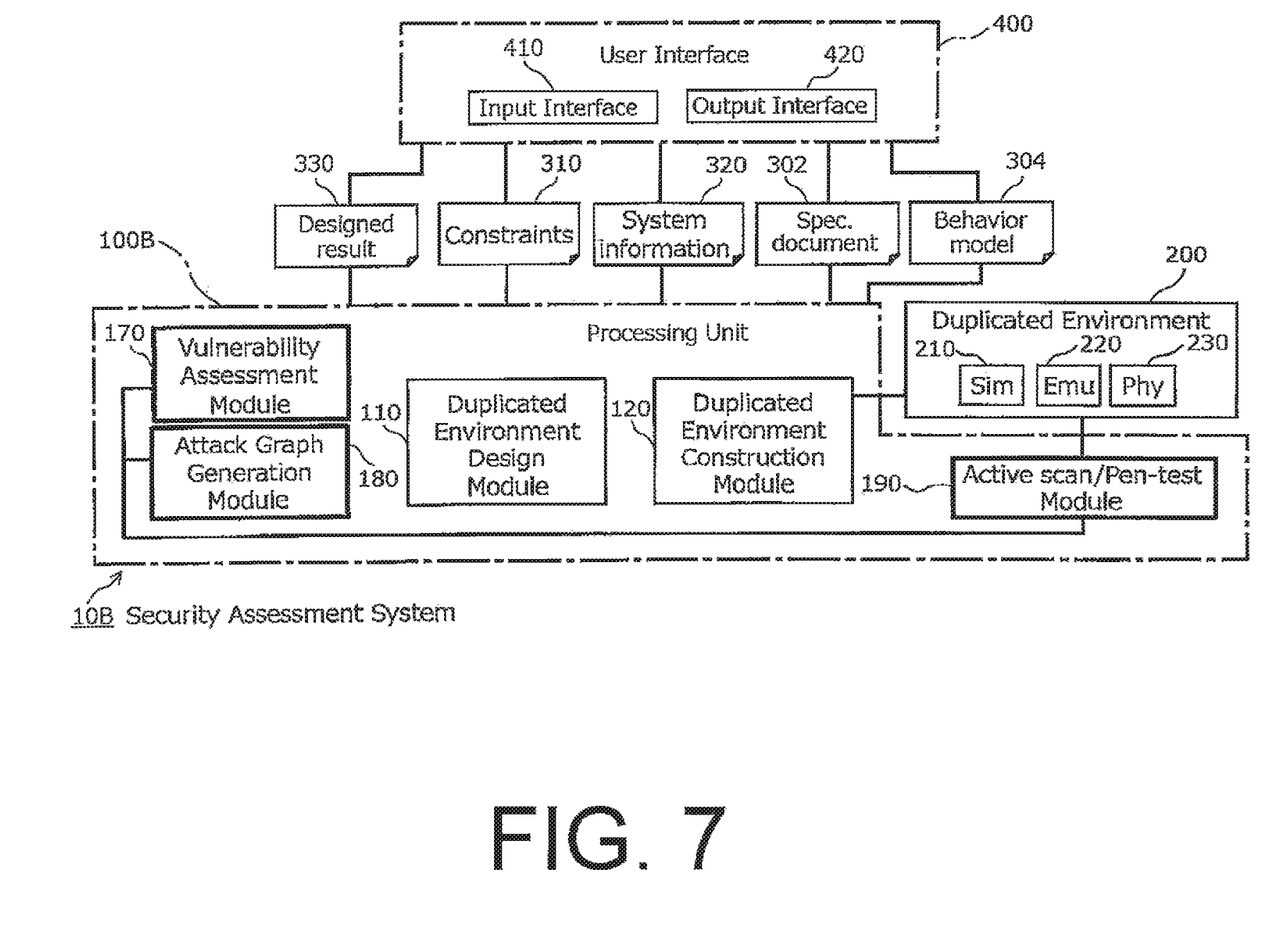
FIG. 7 is a block diagram that illustrates a structure example of a security assessment system according to a third example embodiment in the present invention.

FIG. 7 is a block diagram that illustrates a structure example of a security assessment system 10B according to the third example embodiment in the present invention. The security assessment system 10B is similar in structure and operation to the security assessment system 10 in the above-mentioned first example embodiment expect that the processing unit is modified in manner which will be described as the description proceeds. Therefore, the processing unit is depicted at 100B. The processing unit 100B further comprises a vulnerability assessment module 170, an attack graph generation module 180, and an active scan/pen-test module 190 in addition to the duplicated environment design module 110 and the duplicated environment construction module 120 in the above-mentioned first example embodiment.

The active scan/pen-test module 190 actively scans and/or pen-tests on the virtual machines of the emulation sub-module 220 and/or the physical machines of the physical sub-module 230 in the duplicated environment 200 to produce a result of an active scan/pen-test. The vulnerability assessment module 170 extracts vulnerabilities of each component in the duplicated environment 200 based on the result of an active/scan/pen-test to generate a list indicative of the extracted vulnerabilities. The attack graph generation module 180 generates, based on the result of an active scan/pen-test, an attack graph in which components in the duplicated environment 200 used in an attack can be distinguished. The duplicated environment design module 110 selects the duplication level based on the list and the attack graph. The security assessment system 10B iteratively performs the above-mentioned process and refines the result of security assessment.

Now, the description will proceed to operations of the vulnerability assessment module 170, the attack graph generation module 180, and the active scan/pen-test module 190 in detail.

The vulnerability assessment module 170 examines whether or not there are which vulnerability about each component in the duplicated environment 200. Typically, such an examination can be realized by comparing information in an existing vulnerability information database and system information obtained by passive scanning. In a case where the information is incorrect, the vulnerability assessment module 170 may overlook the vulnerability which originally exists in or may detect a large number of the vulnerability which does not exist.

The attack graph generation module 180 generates the attack graph where an attack procedure of an attacker is graphed. Typically, the attack graph comprises, as nodes, system state nodes indicative of system states and attacker state nodes indicative of attacker states. The attack graph comprises oriented sides from the system state nodes, which become necessary conditions in order to take the attacker actions, to the corresponding attacker state nodes. In addition, the attack graph comprises oriented sides from the attacker action states to states produced by the attacker actions. The attack graph presents information indicating how many kinds of attacks is used in a host or information indicating which vulnerability is used as an attack.

The active scan/pen-test module 190 comprises an interface for other software and other users which can perform the active scan and penetration test to the components reproduced in the emulation sub-module 220 and the physical sub-module 230 on the duplicated environment 200. In addition, the active scan/pen-test module 190 may comprise an interface which is configured to input results of the active scan and the penetration test and which is configured to inform the vulnerability assessment module 170 and the attack graph generation module 180 of the results. The active scan/pen-test module 190 may have an active scan function and a penetration test function to automatically perform the active scan and the penetration test. For example, the active scan/pen-test module 190 may comprise an existing active scan tool and/or an existing penetration test tool to perform a predetermined active scan and/or a predetermined penetration test. The existing active scan tool may, for example, be "Open VAS" while the existing penetration test tool may, for example, be "metasploit". The active scan/pen-test module 190 may collect vulnerability attack codes published to carry out the penetration test using the vulnerability attach codes corresponding to the assessment target components.

Figure 8:
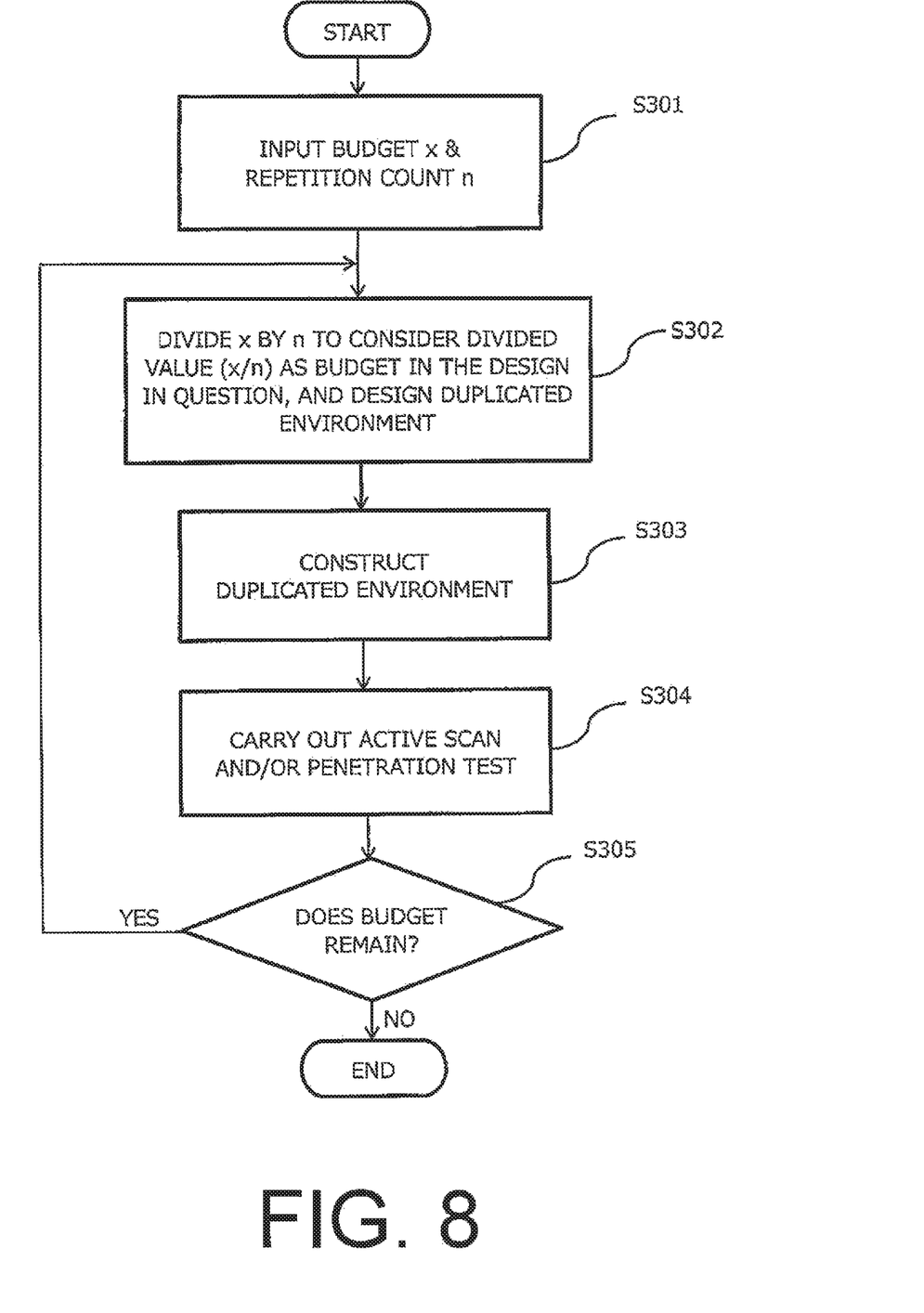
FIG. 8 is a flow diagram that illustrates an overall operation of the security assessment system illustrated in FIG. 5.

Referring to FIG. 8, the description will proceed to an overall operation of the security assessment system 10B.

The processing unit 100B is supplied with, as the constraints 310 from the input interface 410, a budget x and a repetition count n by the user (step S301).

Subsequently, the duplicated environment design module 110 divides the budget x by the repetition count n to consider a divided value (x/n) as a budget in the design in question and designs the duplicated environment 200 in the manner as the above-mentioned first example embodiment (step S302). As being distinct from the above-mentioned first example embodiment, the duplicated environment design module 110 can use a result of the vulnerability assessment module 170 (the above-mentioned list) and a result of the attack graph generation module 180 (the attack graph).

Next, the duplicated environment construction module 120 constructs the duplicated environment 200 in the manner as the above-mentioned first example embodiment to provide the duplicated environment 200 to a user which may be different from the user in step S301 (step S303).

The user can carry out the active scan and/or the penetration test on the duplicated environment 200 using the active scan/pen-test module 190 (step S304).

The processing unit 100B determines whether or not the budget remains (step S305). If the budget remains (YES in step S305), the processing is turned back to the step S302. If the budget does not remain (NO in step S305), the processing comes to an end.

According to the third example embodiment, it is possible to refine results of security assessment by iteratively performing the active scan/pen-test, the vulnerability assessment and the attack graph generation.

The respective modules of the processing unit 100B in the security assessment system 10B may be realized using a combination of hardware and software. In a mode of the combination of the hardware and the software, the respective modules are realized as various means by developing a security assessment program in a RAM (random access memory) and by operating hardware such as a control unit (CPU (central processing unit)) or the like based on the security assessment program. The security assessment program may be recorded in a recording medium which may be distributed. The security assessment program recording in the recording medium is read in a memory via a wire, wireless, or the recording medium itself to operate the control unit or the like. The recording medium may by example be an optical disc, a magnetic disk, a semiconductor memory device, a hard disc, or the like.

If describing the above-mentioned third example embodiment by another expression, the processing unit 100B in the security assessment system 10B can be realized to cause a computer to operate, based on the security assessment program developed in the RAM, the duplicated environment design module 110, the duplicated environment construction module 120, the vulnerability assessment module 170, the attack graph generation module 180, and the active scan/pen-test module 190.

While the invention has been particularly shown and described with reference to an example embodiment thereof, the invention is not limited to the embodiment. It will be understood by those of ordinary skill in the art that various changes in form and details may be made therein without departing from the spirit and scope of the present invention as defined by the claims.

For example, although each of the simulation sub-module 210, the emulation sub-module 220, and the physical sub-module 230 in the duplicated environment 200 is typically determined in each host (physical device), this invention does not be limited to this. About a host, the simulation sub-module 210, the emulation sub-module 220, and the physical sub-module 230 are determined each of components in the host. For example, only specific software may be emulated. In place of this, only NIC (Network Interface Card) may be configured as the physical sub-module 230 and others may be realized by operating the virtual machines (VMs) on another hardware (HW).

REFERENCE SIGNS LIST 10, 10A, 10B Security Assessment System
100, 100B Processing Unit
110 Duplicated Environment Design Module
120 Duplicated Environment Construction Module
122 External IF
124 Duplicated Environment Configuration sub-module
170 Vulnerability Assessment Module
180 Attack Graph Generation Module
190 Active scan/Pen-test Module
200 Duplicated Environment
210 Simulation sub-module
220 Emulation sub-module (Virtual machine)
230 Physical sub-module (Physical machine)

240 Emulation/physical IF
250 External IF
310 Constraints
320 System information
330 Designed result
400 User Interface
410 Input Interface
420 Output Interface
500 Storage Device
510 Document/model DB
520 Virtual machine pool
530 Physical machine pool
532 Virtual NW

The invention claimed is:

1. A security assessment system configured to provide a duplicated environment which duplicates an assessment target system comprising a plurality of physical components, the security assessment system comprising:
a duplicated environment design circuitry configured to decide a duplication level for each physical component based on constraints specified by a user in order to design the duplicated environment to produce a designed result indicative of a duplicated environment design, the duplication level indicating one of a simulation sub-module, an emulation sub-module, and a physical sub-module which are for reproducing the physical components of the assessment target system, the duplicated environment design circuitry deciding, in accordance with the constraints, which physical component should be assessed by the simulation sub-module, the emulation sub-module, or the physical sub-module, the constraints being requirements of budget, each physical component being associated with a monetary cost, the duplicated environment design circuitry deciding the physical components as the physical sub-module, the emulation sub-module, and the simulation sub-module in ascending order of the monetary cost from cheapest, within the budget; and
a duplicated environment construction circuitry configured to construct the duplicated environment based on the designed result, the duplicated environment comprises components which are duplicated by one of the duplication level.

2. The security assessment system as claimed in claim 1,
wherein the simulation sub-module comprises at least one of a specification of the physical component and a behavior model of a function of the physical component,
wherein the emulation sub-module comprises software which reproduces the physical component using a virtual machine, and
wherein the physical sub-module comprises at least one physical machine which is physically similar to the physical component in the assessment target system.

3. The security assessment system as claimed in claim 2,
wherein the security assessment system further comprises:
a document/model database storing documents indicative of specifications and a plurality of behavior models;
a virtual machine pool storing a plurality of virtual machines; and
a physical machine pool storing a plurality of physical machines,
wherein the duplicated environment construction circuitry is configured to:
store at least one document and/or at least one behavior model at the simulation sub-module from the document/model database;
configure and store at least one virtual machine at the emulation sub-module from the virtual machine pool; and
configure at least one network between the virtual machines and the physical machine in the physical machine pool.

4. The security assessment system as claimed in claim 2,
wherein the security assessment system further comprises:
an active scan/pen-test circuitry configured to actively scan and/or pen-test on the virtual machine and/or the physical machine in the duplicated environment to produce a result of an active scan/pen-test,
a vulnerability assessment circuitry configured to extract vulnerabilities of each component in the emulation sub-module and the physical sub-module based on the result of an active scan/pen-test to generate a list indicative of the extracted vulnerabilities; and
an attack graph generation circuitry configured to generate an attack graph based on the result of an active scan/pen-test,
wherein the duplicated environment design circuitry configured to select the duplication level based on at least one of the list and the attack graph.

5. The security assessment system as claimed in claim 2,
wherein the security assessment system further comprises:
an input interface configure to input the constraints, the specification, the behavior model, any signal on channels between the virtual machines, between the virtual machine and the physical machine, and between the physical machines; and
an output interface configured to output a response of the behavior model in response to the input, contents of the specification, and communication information between the virtual machines, between the virtual machine and the physical machine, and between the physical machines.

6. A method, performed by an information processing unit, of providing a duplicated environment which duplicates an assessment target system comprising a plurality of physical components, the method comprising:
deciding a duplication level for each physical component based on constraints specified by a user in order to design the duplicated environment to produce a designed result indicative of a duplicated environment design, the duplication level indicating one of a simulation sub-module, an emulation sub-module, and a physical sub-module which are for reproducing the physical components of the assessment target system, deciding, in accordance with the constraints, which physical component should be assessed by the simulation sub-module, the emulation sub-module, or the physical sub-module, the constraints being requirements of budget, each physical component being associated with a monetary cost, whereby deciding the physical components as the physical sub-module, the emulation sub-module, and the simulation sub-module in ascending order of the monetary cost from cheapest, within the budget; and
constructing the duplicated environment based on the designed result, the duplicated environment comprises components which are duplicated by one of the duplication level.

7. The method as claimed in claim 6,
wherein the simulation sub-module comprises at least one of a specification of the physical component and a behavior model of a function of the physical component, wherein the emulation sub-module comprises software which reproduces the physical component using a virtual machine, and wherein the physical sub-module comprises at least one physical machine which is physically similar to the physical component in the assessment target system.

8. The method as claimed in claim 7, wherein the method further comprises:

actively scanning and/or pen-testing on the virtual machine and/or the physical machine in the duplicated environment to produce a result of an active scan/pen-test, extracting vulnerabilities of each component in the emulation sub-module and the physical sub-module based on the result of an active scan/pen-test to generate a list indicative of the extracted vulnerabilities; and generating an attack graph based on the result of an active scan/pen-test, wherein the selecting selects the duplication level based on the list and the attack graph.

9. A non-transitory computer readable recording medium in which a security assessment program is recorded, the security assessment program causing a computer to execute so as to provide a duplicated environment which duplicates an assessment target system comprising a plurality of physical components, the security assessment program causing the computer to execute the steps of:

deciding a duplication level for each physical component based on constraints specified by a user in order to design the duplicated environment to produce a designed result indicative of a duplicated environment design, the duplication level indicating one of a simulation sub-module, an emulation sub-module, and a physical sub-module which are for reproducing the physical components of the assessment target system, deciding, in accordance with the constraints, which physical component should be assessed by the simulation sub-module, the emulation sub-module, or the physical sub-module, the constraints being requirements of budget, each physical component being associated with a monetary cost, whereby deciding the physical components as the physical sub-module, the emulation sub-module, and the simulation sub-module in ascending order of the monetary cost from cheapest, within the budget; and constructing the duplicated environment based on the designed result, the duplicated environment comprises components which are duplicated by one of the duplication level.

10. The non-transitory computer readable recording medium as claimed in claim 9, wherein the simulation sub-module comprises at least one of a specification of the physical component and a behavior model of a function of the physical component, wherein the emulation sub-module comprises software which reproduces the physical component using a virtual machine, and wherein the physical sub-module comprises at least one physical machine which is physically similar to the physical component in the assessment target system.

* * * * *